UNITED STATES PATENT OFFICE.

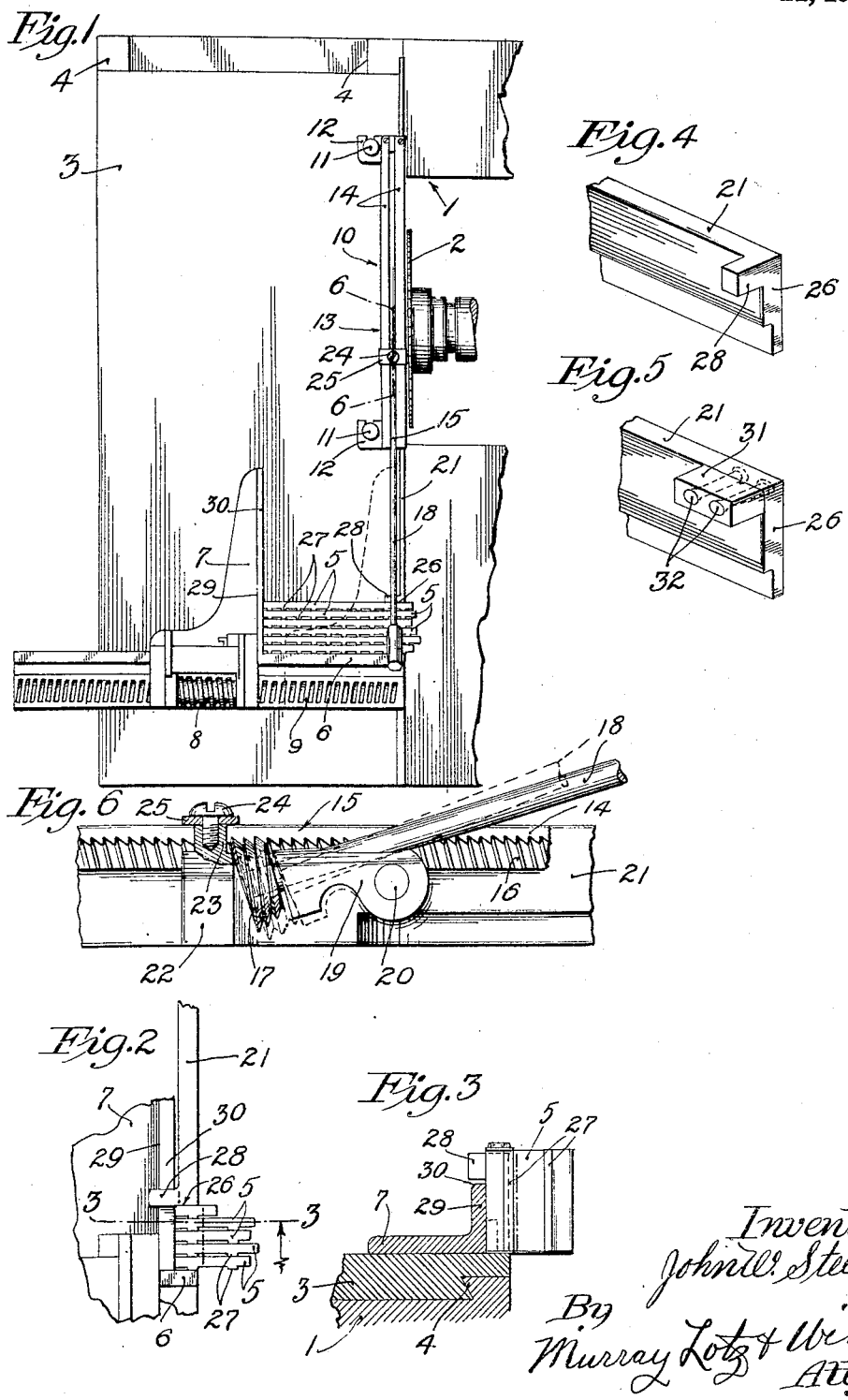

JOHN W. STEELE, OF CHICAGO, ILLINOIS.

WORK HOLDER FOR SAW TABLES.

1,410,135.  Specification of Letters Patent.  Patented Mar. 21, 1922.

Application filed March 26, 1920. Serial No. 368,902.

*To all whom it may concern:*

Be it known that I, JOHN W. STEELE, a citizen of the United States, and resident of Chicago, in the county of Cook and State of Illinois, have invented certain new and useful Improvements in Work Holders for Saw Tables, of which the following is a specification.

My invention relates to improvements in work holding devices for saw tables and has special reference to devices for holding linotype or printing slugs while they are being cut or sawed to a desired length.

Type bars or slugs, especially those commonly known as linotype slugs, are provided with vertical fitting ribs spaced longitudinally of the slugs and it is found that with the form of clamping bars in common use on devices of this character these fitting ribs prevent the rigid clamping of several bars between the abutment and the clamping bar, particularly when it is desired to produce extremely short type bars, such for instance, as two or three ems in length.

In fact the danger of the displacement of the type bars when held by the ordinary pressure device and when it is desired to produce very short type bars, is so great that the production of short type-bars is seldom attempted without undesired results. These results may be merely the loosening and throwing about of the type-bars being cut, but frequently serious accidents such as the cutting off or maiming of the operator's fingers occur, as well as the mutilating of the type-bars.

By means of my improvement I am enabled to produce the shortest length slugs desired even though such slugs carry only one of the vertical ribs and with substantially no possibility of the accidental displacement of the slugs in the cutting operation.

My improved work holder comprises a fixed abutment and a thin pressure-bar set on edge and means for forcing the bar endwise towards the abutment to clamp a plurality of type-bars against the abutment while they are being sawed. The fixed abutment is associated with a movable abutment adapted to be set from and toward the plane of the saw and against which the desired ends of the slugs are placed for alignment. Means are provided for forcing and locking the pressure-bar against the pile of slugs for the sawing operation, and I provide a fixed right-angle projection on the free end of the pressure-bar for contact with the slugs, which serves to spread out transversely of the pressure bar and longitudinally of the slugs, the contact of the end of the bar with the slugs. This wide contacting surface prevents the spreading of the slugs and serves to hold them tightly clamped in place against the fixed abutment.

I do not extend this lateral projection from the top to the bottom of the pressure-bar, as it would then interfere with the movable abutment when the very short slugs are desired but I so arrange it that the movable abutment can be moved substantially into contact with the adjacent side of the pressure-bar at which times the projection overlaps or extends over the movable abutment.

My invention involves more than the mere widening or thickening of the work contacting end of the pressure-bar. It comprises the provision of such an enabling projection on the bar and so arranged with reference to the movable abutment that the bar or projection does not have to be changed or altered for cutting slugs of extreme shortness or longer.

My invention will be more readily understood by reference to the accompanying drawings forming part of this specification, and in which:—

Figure 1 is a fragmentary top plan view of the saw-table provided with a work holding device embodying my invention;

Figure 2 is a fragmentary top plan view showing the pressure-bar and a plurality of type-bar slugs arranged for the production of extremely short slug sections;

Figure 3 is a fragmentary vertical section on the line 3—3 of Figure 2;

Figure 4 is a fragmentary perspective view of the slug contacting end of the pressure-bar;

Figure 5 is a similar view of a modified form of the bar; and

Figure 6 is a fragmentary vertical sectional view on the line 6—6 of Figure 1, particularly illustrating the means which I employ for forcing the pressure bar into contact with the slugs.

In said drawings:

1 represents a saw-table having a circular saw 2 and a movable saw-table or top 3 which is movable in guides 4 past the saw for cutting slugs 5 to a desired length. On the movable top 3 is arranged a transverse fixed abutment 6 against which the plurality of slugs 5 are arranged, and in connection with this abutment there is provided a transversely movable abutment 7 which extends at right angles to the abutment 6 and is adjustable longitudinally of the abutment 6 to position the slugs 5 so that the saw will cut them to the desired length. The abutment 7 is movable by means of a screw worm 8 intermeshing with a screw rack 9 provided on the abutment 6.

For holding the slugs against the abutment 6 I provide a holding device 10 adapted to be removably secured upon the saw-table top 3 by screws 11, the holding device being provided with lugs 12 for receiving these screws.

The holding device 10 comprises an elongated frame 13 having side walls 14 and a central longitudinal slot 15 in its upper side. It is provided with a screw rack 16 underneath its top and I provide a worm 17 for engaging this rack. The dog is mounted on the lower end of an operating handle 18 which is rotatably mounted in a block 19 pivotally mounted on a pin 20 carried by a sliding pressure-bar 21. This bar 21 is guided in the holder 10 and is adapted to be moved longitudinally of the holder frame by means of the handle member 18. By means of the handle member 18 the block 19 and worm 17 are rotated on the pin 20 to cause the worm to engage and disengage the screw rack. When the worm is disengaged from the screw rack the pressure-bar 21 can be moved freely longitudinally of the holder to position it against the slugs to be held and when it is positioned against the slugs a downward movement of the handle 18 lifts the worm 17 into the rack and then by rotating the handle the worm 17 is rotated and the bar 21 is forced against the slugs with considerable force. When thus pressed against the slugs the bar is locked against freeing the slugs by the worm 17 and rack 16. The bar 21 carries a block 22 arranged to the lower or inner end of the worm 17 and against which the worm rests to hold the handle 18 against longitudinal movement in the block 19. This block 22 carries a vertical projection 23 which extends up through the slot 15 and receives a screw 24 by which a transverse binder strap 25 is secured in position. This strap 25 extends transversely across the two side walls of the holder and prevents these side walls springing upwardly by reason of the tightening of the worm 17, when clamping slugs.

The pressure-bar 21 is a thin bar placed on edge and its slug contacting end 26 is cut square and adapted to be pressed flat against the slugs to hold them pressed against the abutment 6. The bar is thin so that the abutment 7 may be placed as close as possible to the plane of the saw for positioning slugs to produce very short slugs as best indicated in Figure 2.

The slugs 5 which are represented as being the well known linotype slugs are each provided with a plurality of vertical fitting ribs 27, which ribs are spaced substantially ⅜ of an inch apart longitudinally of the slug and the body of the pressure-bar 21 is preferably only about ⅛ of an inch thick. Consequently when cutting very short slugs the pressure bar is apt to press against the slugs between the fitting ribs 27 and the abutment 7 or directly over the fitting ribs as shown in Figure 2, in which position the slugs are apt to become loosened by the sawing operation and fly or jump out of their clamping position. In fact it is difficult to properly clamp these slugs for producing short length slugs by means of the narrow bar 21. At other times the narrow end of the pressure-bar presses against the free ends of the slugs beyond the outmost ribs, under which condition the inner ends of the slugs are apt to spread out and loosen the slugs.

For the purpose of holding the slugs firmly clamped whether they are positioned to produce long or short portions of the slugs, I provide a transversely extending projection 28 on the slug contacting end 26 of the bar 21 having its forward face flush with the end 6 and extending on the side of the bar 21 in a direction away from the saw so that the bar itself can be placed close to the plane of the saw as best shown in Figure 1 without danger of the projection 28 contacting with the saw.

I arrange the projection 28 at the upper edge of the pressure bar 21 and relatively narrow vertically, but at a height where it will contact with the slugs 5 as best shown in Figure 3. The abutment member 7 is provided with a vertical flange 29 against which the inner ends of the slugs 5 are positioned to align the slugs for sawing. This flange 29 does not reach to the top of the slugs, its upper edge 30 being arranged below the lower edge of the projection 28 so that the projection 28 can pass freely over the flange 29 when the several parts are arranged for cutting extremely short slugs as shown in Figures 2 and 3. The projection 28 widens the slug contacting end of the bar 21 sufficiently so that it is as wide or wider than the distance from one rib to the next, and it is preferably about once and a half as wide as the spacing of the ribs and it performs its function of assisting in firmly holding the slugs 5 whether long or short slugs are being cut. It does not interfere with the positioning of the abutment 7 when extremely short slugs are desired. In other words, the projection 28 does not have to be removed from the bar 21 for the purpose of cutting extremely short slugs as would be the case if the projection 28 extended below the top of the flange 29.

While I have shown the projection 28 in Fig. 4 as being made integral with the bar 21 it will be obvious that the projection can be a separate piece of metal secured permanently upon the bar 21 as illustrated in Figure 5 wherein I have shown a block 31 of similar vertical dimensions and positioned similarly to the projection 28 and permanently secured to the bar 21 by means of rivets 32.

As it is obvious that many modifications of my invention will readily suggest themselves to one skilled in the art, I do not limit or confine my invention to the specific structures herein shown and described.

I claim:

1. In a device of the kind described, the combination with a circular saw, a table movable past the saw for cutting type-bars, a transverse fixed abutment on the table against which the type-bars are held, a relatively thin pressure-bar set on edge and means for pressing it endwise towards the fixed abutment to hold a plurality of type-bars against the abutment, the bar having an integral projection on its type-bar contacting end extending on the side opposite to the saw and arranged near one lateral edge of the bar, said projection being adapted to provide a wide bearing surface of the bar on the slugs, substantially as described.

2. In a device of the kind described, a circular saw, a table movable past the saw for cutting type-bars, a transverse fixed abutment on the table against which the type-bars are held, a relatively thin pressure-bar set on edge and means for pressing it endwise towards the fixed abutment to clamp a plurality of type-bars against the abutment, a transversely movable abutment for aligning the ends of the type-bars, a projection on the end of the pressure-bar for widening the contact between the pressure bar and the type-bars, the projection and the movable abutment being arranged to freely overlap when the abutment is adjusted close to the adjacent side of the pressure-bar, substantially as described.

3. In a device for sawing linotype slugs, a circular saw, a table movable past the saw for cutting the slugs, a transverse fixed abutment on the table against which the slugs are held, a transversely movable abutment associated with the fixed abutment and against which the ends of the slugs are aligned, a relatively thin pressure-bar set on edge, and means for pressing it endwise towards the fixed abutment, to clamp a plurality of slugs against the abutment, a transversely extending projection on the slug contacting end of the bar for widening the contact between the bar and the type slugs, the movable abutment being of less height than the pressure-bar, and said projection being arranged to pass freely over the movable abutment when the abutment is adjusted close to the pressure-bar, substantially as described.

4. In a device of the kind described, a saw, a type slug support movable past the saw for cutting slugs having transverse fitting ribs spaced substantially uniformly longitudinally of the slugs, a fixed abutment on the support against which the slugs are held, a movable abutment for aligning the ends of the slugs, a relatively thin pressure-bar set on edge and means for forcing the pressure-bar endwise against the slugs, an integral transversely extending projection on the slug contacting end of the pressure-bar of less height than the height of said bar to make the contacting surface wider than the spacing of the fitting ribs on the slugs, substantially as described.

5. In a device for sawing linotype slugs, a circular saw, a table movable past the saw for cutting the slugs, a transverse fixed abutment on the table against which the slugs are held, a transversely movable abutment associated with the fixed abutment and against which the ends of the slugs are aligned, a relatively thin pressure-bar set on edge, and means for pressing it endwise towards the fixed abutment, to clamp a plurality of slugs against the abutment, a transversely extending projection on the slug contacting end of the bar for widening the contact between the bar and the slugs, the pressure bar being of greater vertical width than the slug contacting surface of the movable abutment, and said projection adapted to project beyond said contacting surface of the movable abutment when the abutment is moved into close proximity to the bar, as and for the purpose specified.

Signed at Chicago, Illinois, this 20th day of March, 1920.

JOHN W. STEELE.

Witness:
T. D. BUTLER.